(12) United States Patent
Lim et al.

(10) Patent No.: US 12,160,528 B2
(45) Date of Patent: Dec. 3, 2024

(54) SYSTEM FOR PROVIDING EDR DATA OF VEHICLE AND METHOD THEREOF

(71) Applicants: Hyundai Motor Company, Seoul (KR); Kia Corporation, Seoul (KR); HYUNDAI AUTOEVER Corp., Seoul (KR)

(72) Inventors: Hong Yeol Lim, Incheon (KR); Bong Ju Kim, Yongin-Si (KR)

(73) Assignees: Hyundai Motor Company, Seoul (KR); Kia Corporation, Seoul (KR); HYUNDAI AUTOEVER Corp., Seoul (KR)

( * ) Notice: Subject to any disclaimer, the term of this patent is extended or adjusted under 35 U.S.C. 154(b) by 223 days.

(21) Appl. No.: 18/082,533

(22) Filed: Dec. 15, 2022

(65) Prior Publication Data

US 2024/0039738 A1    Feb. 1, 2024

(30) Foreign Application Priority Data

Jul. 28, 2022    (KR) .......................... 10-2022-0094053

(51) Int. Cl.
*H04L 29/06*    (2006.01)
*H04L 9/06*    (2006.01)
*H04L 9/32*    (2006.01)

(52) U.S. Cl.
CPC .......... *H04L 9/3268* (2013.01); *H04L 9/0618* (2013.01); *H04L 9/3242* (2013.01); *H04L 9/3247* (2013.01)

(58) Field of Classification Search
CPC ... H04L 9/3242; H04L 9/0618; H04L 9/3268; H04L 9/3247; H04L 2209/84
See application file for complete search history.

(56) References Cited

U.S. PATENT DOCUMENTS 10,635,108 B2 *    4/2020    Liu ...................... G05D 1/0088

FOREIGN PATENT DOCUMENTS

CN    115174065 A    * 10/2022

* cited by examiner

*Primary Examiner* — Tri M Tran
(74) *Attorney, Agent, or Firm* — Banner & Witcoff, Ltd.

(57) ABSTRACT

Disclosed are a system for providing event data recorder (EDR) data of a vehicle and a method thereof. The system may include a user terminal and a server. The user terminal may determine a first hash value of a certificate, and transmit the first hash value to a server. The server may receive the certificate and encrypted EDR data from an autonomous driving controller, decrypt, using a public key included in the certificate, a digital signature of the certificate to obtain a second hash value, and, based on a comparison between the first and second hash values, decrypt, using a private key, the encrypted EDR data, and transmit the decrypted EDR data to the user terminal. The user terminal may receive the decrypted EDR data from the server, and provide the decrypted EDR data to a user.

16 Claims, 5 Drawing Sheets

SYSTEM FOR PROVIDING EDR DATA OF VEHICLE AND METHOD THEREOF

CROSS-REFERENCE TO RELATED APPLICATION

This application claims the benefit of priority to Korean Patent Application No. 10-2022-0094053, filed in the Korean Intellectual Property Office on Jul. 28, 2022, the entire contents of which are incorporated herein by reference.

TECHNICAL FIELD

The present disclosure relates to a technology for facilitating user access while preventing forgery and falsification of event data recorder (EDR) data of a vehicle.

BACKGROUND

In general, an event data recorder (EDR), which is a device that records driving information for a specified time before/after an accident (e.g., a collision) when an accident (event) of a certain condition occurs while driving a vehicle, is built in an air bag control unit (ACU) or an engine electronic control unit (ECU) to record various data. The various data may include a vehicle speed, a brake pedal position (BPS), an engine revolution per minute (RPM), an accelerator pedal position (APS), a throttle valve position (TVS), a steering wheel angle, whether a seat belt is worn, a gear position, air bag deployment data, a tire pressure, a lateral acceleration, a longitudinal acceleration, a yaw rate, and the like.

Because the EDR data plays an important role in investigating the cause of an accident, the EDR data may become a coveted target for forgery and falsification. Accordingly, various techniques have been proposed for preventing forgery. As an example, one technique for preventing EDR data from being forged encrypts the EDR data with an encryption mechanism such as a hash function, a keyed-hash message authentication code (HMAC), a symmetric key, and/or a public key to generate forgery determination data and verifying the integrity of the EDR data based on the forgery determination data.

Because EDR data-related technologies proposed so far are only focused on preventing forgery and falsification of EDR data, and do not consider the user's convenience of accessing EDR data, it is impossible for a user to access to EDR data without the assistance of a designated mechanic.

Therefore, there is a need to provide a scheme capable of ensuring the confidentiality and integrity of EDR data while improving the user's convenience of accessing EDR data.

The matters described in this background section are intended to promote an understanding of the background of the disclosure and may include matters that are not already known to those of ordinary skill in the art.

SUMMARY

The present disclosure has been made to solve the above-mentioned problems occurring in the prior art while advantages achieved by the prior art are maintained intact.

An aspect of the present disclosure provides a system for providing EDR data of a vehicle and a method thereof capable of collecting the EDR data of the vehicle to store the EDR data in a double buffer, generating transport layer security (TLS) sessions with a server and a user terminal, respectively when the accident risk of the vehicle exceeds a first threshold value, and transmitting the EDR data to the server and the user terminal through the TLS session after encrypting the EDR data with a public key when the accident risk of the vehicle exceeds a second threshold value, thereby ensuring the confidentiality of EDR data while improving the user's convenience in accessing EDR data.

Another aspect of the present disclosure provides a system for providing EDR data of a vehicle and a method thereof capable of receiving a certificate and encrypted EDR data from an autonomous driving controller, receiving a hash value from a user terminal, decrypting a digital signature of the certificate with a public key included in the certificate, comparing the decrypted result (e.g., hash value) with a hash value received from the user terminal, and decrypting the encrypted EDR data with a private key to transmit the EDR data to the user terminal when they are the same, thereby ensuring the confidentiality of EDR data while improving the user's convenience in accessing EDR data.

Still another aspect of the present disclosure provides a system for providing EDR data of a vehicle and a method thereof capable of determining a hash value of a certificate stored in advance, creating a TLS session with the server, transmitting a hash value to a server through the TLS session, and receiving the decrypted EDR data from the server to provide the decrypted EDR data to a user, thereby ensuring the confidentiality of EDR data while improving the user's convenience in accessing EDR data.

The technical problems to be solved by the present disclosure are not limited to the aforementioned problems, and any other technical problems not mentioned herein will be clearly understood from the following description by those skilled in the art to which the present disclosure pertains.

According to one or more embodiments of the present disclosure, a server may receive a first hash value from a user terminal; and receive a certificate and encrypted event data recorder (EDR) data from an autonomous driving controller. The certificate may include a digital signature and a public key. The server may decrypt, using the public key, the digital signature to obtain a second hash value; based on a comparison between the first hash value and the second hash value: decrypt, using a private key, the encrypted EDR data; and transmit the decrypted EDR data to the user terminal.

The server may delete the decrypted EDR data after the transmitting of the decrypted EDR data is completed.

The first hash value may correspond to an output of a hash function based on a plaintext of the certificate stored in the user terminal.

The server may store the private key in security key storage.

The server may generate transport layer security (TLS) sessions with the autonomous driving controller and the user terminal, respectively. Receiving the first hash value and the transmitting of the decrypted EDR data may be performed via the TLS sessions.

A user terminal may determine a hash value of a certificate stored in a memory, generate a transport layer security (TLS) session with a server, transmit the hash value to the server through the TLS session, receive event data recorder (EDR) data from the server, and providing the EDR data to a user.

The user terminal may delete the EDR data after the user finishes accessing the EDR data.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
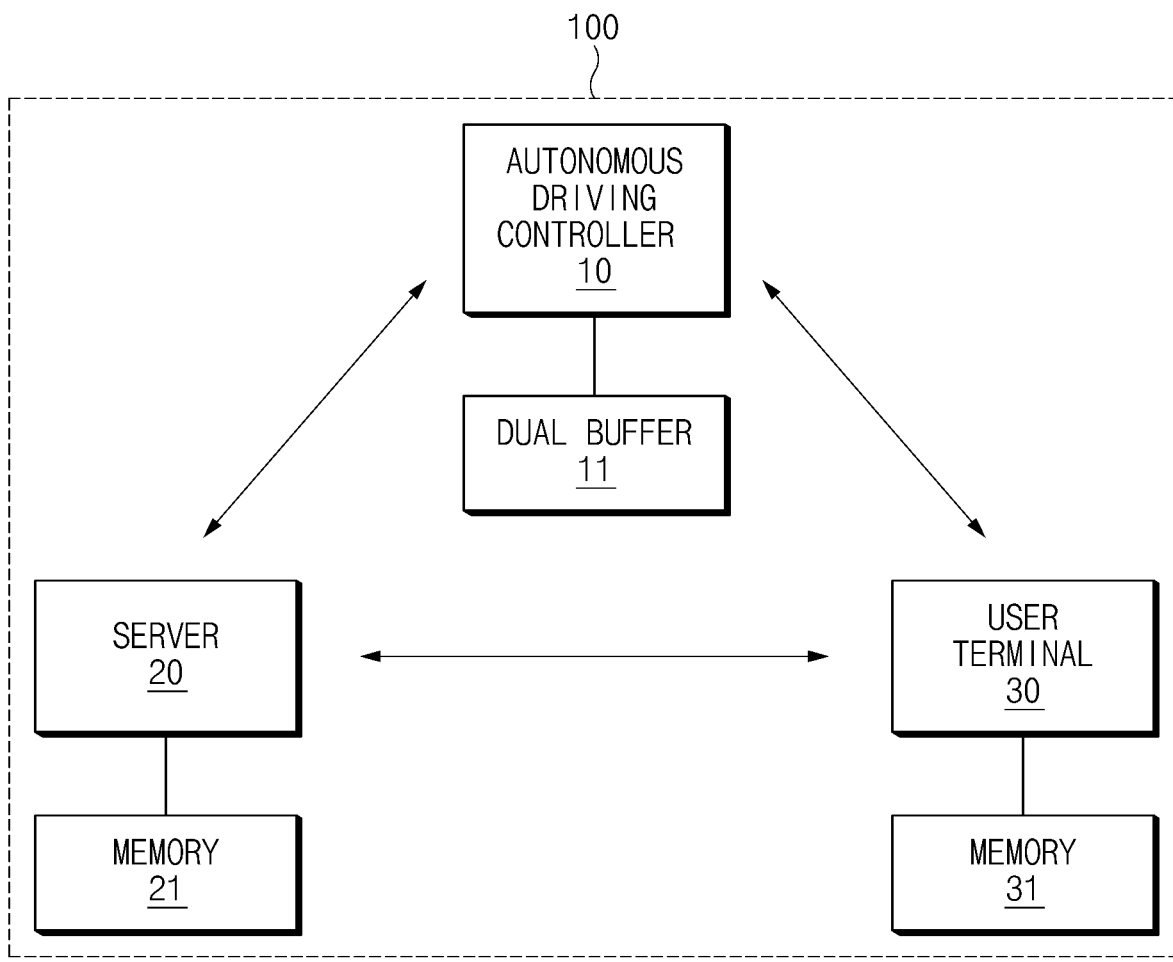
FIG. 1 is a diagram illustrating an example system for providing EDR data of a vehicle.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function will be omitted when it is determined that it interferes with the understanding of the embodiment of the present disclosure.

In describing the components of the embodiment according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a diagram illustrating an example system for providing EDR data of a vehicle.

As shown in FIG. 1, a system 100 for providing EDR data of a vehicle may include an autonomous driving controller 10, a server 20 and a user terminal 30.

The autonomous driving controller 10 may perform overall control in relation to autonomous driving of a vehicle. The autonomous driving controller 10 may be implemented in the form of hardware, software, or a combination of hardware and software. Preferably, the autonomous driving controller 10 may be implemented as a microprocessor, but is not limited thereto.

The autonomous driving controller 10 may collect the EDR data of a vehicle to store the EDR data in a dual buffer 11, generate transport layer security (TLS) sessions with the server 20 and the user terminal 30, respectively, if an accident risk of the vehicle exceeds a first threshold value. The autonomous driving controller 10 may transmit the EDR data to the server 20 and the user terminal 30 through the TLS sessions, respectively, after encrypting the EDR data with a public key if the accident risk of the vehicle exceeds a second threshold value.

The autonomous driving controller 10 may receive a certificate from the server 20, and may encrypt the EDR data by using a public key included in the certificate.

The autonomous driving controller 10 may generate the TLS sessions with the server 20 and the user terminal 30 based on the certificate.

The autonomous driving controller 10 may encrypt the EDR data collected for a specified time before and/or after an accident (e.g., a collision) and transmit the encrypted the EDR data to the server 20 and the user terminal 30.

The autonomous driving controller 10 may encrypt the EDR data in response to a request from the server 20 and transmit the encrypted EDR data to the server 20 and the user terminal 30, or may encrypt the EDR data in response to a request from the user terminal 30 and transmit the encrypted EDR data to the server 20 and the user terminal 30.

The autonomous driving controller 10 may include, for example, the dual buffer 11 that is a volatile memory, and store the EDR data in the dual buffer 11, thereby enabling real-time EDR data transmission.

In addition, the autonomous driving controller 10 may obtain a relative distance to a preceding (e.g., leading) vehicle and use the relative distance to obtain the speed and acceleration of the preceding vehicle, and then use the relative speed, relative acceleration, and relative distance between the two vehicles to determine the accident risk. The autonomous driving controller 10 may classify the accident risk as one of following levels: a safe level, in which a collision avoidance system is inactive and which is considered the safest state in terms of accident risk; a preparation level, in which the driver's vehicle control state is being measured by sensing the amount of operation of the accelerator, and the collision avoidance system is on standby for intervention if needed; a warning level, in which the driver is notified of danger through vibration or sound and requested to take over control but without controlling the actuator; a deceleration level, in which the actuator is controlled and the vehicle is decelerated by controlling the brake pressure; and a danger level, which requires an immediate stop is considered the most dangerous situation.

The server 20 may receive the certificate and encrypted EDR data from the autonomous driving controller 10, receive a hash value from a user terminal 30, decrypt a digital signature of the certificate with a public key included in the certificate, compare the decrypted result (e.g., hash value) with the hash value received from the user terminal 30, and decrypt the encrypted EDR data with a private key of the server 20 to transmit the decrypted EDR data to the user terminal 30, when the hash values are identical to each other. In this case, the server 20 may request the certificate and encrypted EDR data from the autonomous driving controller 10.

The server 20 may generate the certificate and the private key, and store the generated private key in a memory 21. In this case, the memory 21 may be secure key storage. In addition, the certificate may include the public key.

The server 20 may transmit the certificate including the public key to the autonomous driving controller 10 and the user terminal 30.

Meanwhile, the server 20 may receive the verification result for the hash value from the user terminal 30, and if the verification is successful, decrypt the encrypted EDR data and transmit the decrypted EDR data to the user terminal 30. That is, the server 20 may determine the hash value of the certificate in response to the request from the user terminal 30, generate a TLS session with the user terminal 30 to transmit the hash value to the user terminal 30 through the TLS session, and when receiving a verification completion message from the user terminal 30, decrypt the encrypted EDR data with the private key stored in the memory 21 to transmit the EDR data to the user terminal 30. In this case, the server 20 may determine the hash value by hashing the plain text for the certificate through a hash function (e.g., SHA-256). In addition, the server 20 may generate the digital signature by encrypting the hash value with the private key stored in the memory 21.

The user terminal 30 may determine the hash value of the certificate stored in a memory 31, generate the TLS session with the server 20, transmit the hash value to the server 20 through the TLS session, and receive the EDR data decoded from the server 20 to provide the EDR data to the user. In this case, the user terminal 30 may determine the hash value by hashing the plain text for the certificate through a hash function (e.g., SHA-256).

In this case, the memory 31 may include at least one type of a storage medium of memories of a flash memory type, a hard disk type, a microchip type, a card type (e.g., a secure digital (SD) card or an extreme digital (XD) card), and the like, and a random access memory (RAM), a static RAM (SRAM), a read-only memory (ROM), a programmable ROM (PROM), an electrically erasable PROM (EEPROM), a magnetic memory (MRAM), a magnetic disk, and an optical disk type memory.

Meanwhile, the user terminal 30 may perform a verification process for the hash value. That is, the user terminal 30 may receive the certificate and encrypted EDR data from the autonomous driving controller 10, receive the hash value from the server 20, decrypt the digital signature of the certificate with the public key included in the certificate, compare the decrypted result (e.g., hash value) with the hash value received from the server 20, transmit a verification completion message to the server 20 when the hash values are identical to each other, and receive the decrypted EDR data from the server 20 to provide the decrypted EDR data to the user. In this case, the user terminal 30 may request the certificate and the encrypted EDR data from the autonomous driving controller 10.

Figure 2:
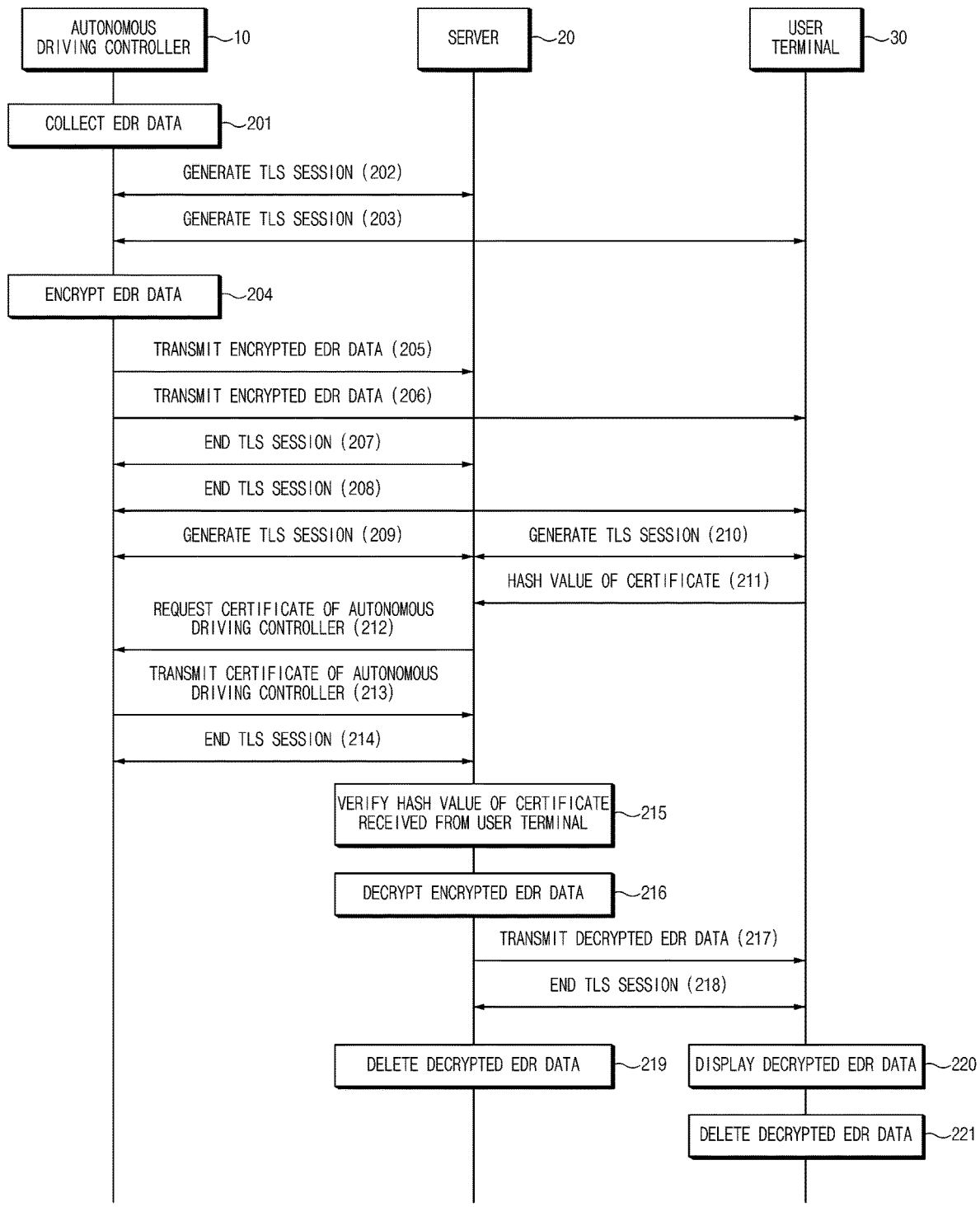
FIG. 2 is a flowchart illustrating an example method of providing EDR data of a vehicle.

FIG. 2 is a flowchart illustrating an example method of providing EDR data of a vehicle. The steps in this flow chart need not all be performed in the order specified and some steps may be omitted or changed in order.

The autonomous driving controller 10 may collect EDR data of the vehicle in step 201. The EDR data collected in such a manner may be stored in the dual buffer 11.

The autonomous driving controller 10 may create TLS sessions with the server 20 and the user terminal 30, respectively in steps 202 and 203.

The autonomous driving controller 10 may encrypt the EDR data by using the public key included in a certificate in step 204. In this case, the autonomous driving controller 10 may obtain the certificate from the server 20.

The autonomous driving controller 10 may transmit the encrypted EDR data to the server 20 and the user terminal 30 through the TLS sessions, respectively in steps 205 and 206.

The TLS session between the autonomous driving controller 10 and the server 20 may be terminated in step 207, and the TLS session between the autonomous driving controller 10 and the user terminal 30 may be terminated in step 208.

Through the process described above, the server 20 and the user terminal 30 may receive the encrypted EDR data. In this case, the server 20 and the user terminal 30 may determine the hash values of the encrypted EDR that have been received, respectively, and further perform the operation of verifying the integrity of the encrypted EDR data by exchanging the determined hash values with each other.

The server 20 may generate the TLS session with the autonomous driving controller 10 in step 209, and generate the TLS session with the user terminal 30 in step 210.

The server 20 may receive the hash value of the certificate from the user terminal 30 in step 211. In this case, the user terminal 30 may determine the hash value of the certificate stored in the memory 31, and transmit the determined hash value to the server 20.

The server 20 may receive the certificate of the autonomous driving controller 10 by requesting the certificate from the autonomous driving controller 10 in steps 212 and 213. When the certificate of the autonomous driving controller 10 is received in such a manner, the TLS session between the autonomous driving controller 10 and the server 20 may be terminated in step 214.

The server 20 may verify the hash value of the certificate received from the user terminal 30 in step 215. That is, the server 20 may decrypt the digital signature of the certificate with the public key included in the certificate received from the autonomous driving controller 10, and compare the decrypted result (e.g., hash value) with the hash value received from the user terminal 30. In this case, if the hash values are identical to each other based on the comparison result, the server 20 may determine that the hash values are verified, and if the hash values are not identical, the server 20 may determine that the hash values are not verified.

The server 20 may decrypt the encrypted EDR data with the private key stored in the memory 21 if the has values are successfully verified in step 216.

The server 20 may transmit the decrypted EDR data to the user terminal 30 in step 217. After the transmission of the decrypted EDR data is completed, the TLS session between the server 20 and the user terminal 30 may be terminated in step 218.

Thereafter, the server 20 may delete the decrypted EDR data in step 219.

In addition, the user terminal 30 may provide (e.g., display) the decrypted EDR data received from the server 20 to the user in step 220.

After the user is done reading the EDR data, the user terminal 30 may delete the decrypted EDR data in step 221.

Figure 3:
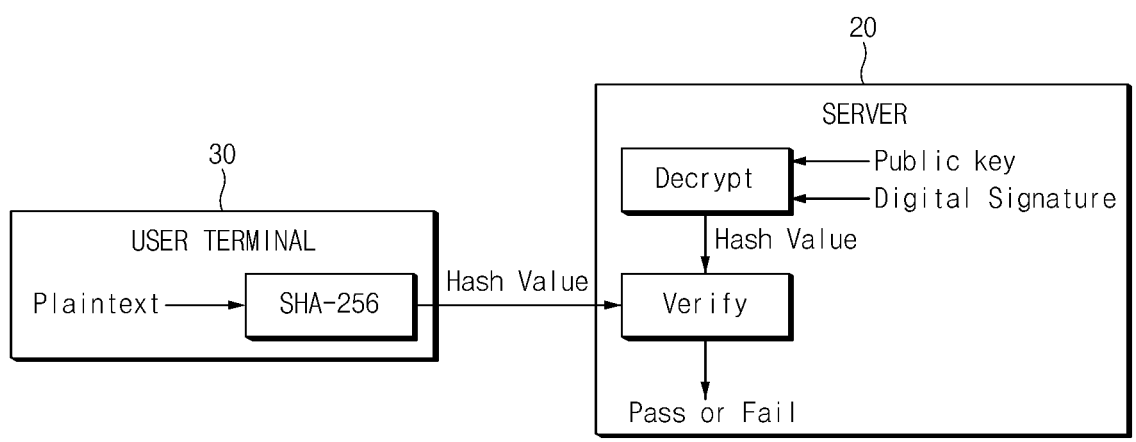
FIG. 3 is a diagram illustrating an example process of verifying a certificate.

FIG. 3 is a diagram illustrating an example process of verifying a certificate. FIG. 3 illustrates a process in which the server 20 verifies the certificate of the user terminal 30.

The user terminal 30 may determine the hash value by inputting the plaintext of the certificate into a hash function (e.g., SHA-256), and transmit the determined hash value to the server 20. It may be possible to generate the digital signature by encrypting the hash value with the private key.

The server 20 may receive the certificate of the autonomous driving controller 10 by requesting the certificate from the autonomous driving controller 10, and decrypting the digital signature of the certificate with the public key included in the certificate. In this case, the result of decrypting the digital signature of the certificate may be a hash value.

The server 20 may perform a hash value verification process by comparing the hash value of the certificate received from the user terminal 30 with the hash value that is the result of the decryption. In this case, if the hash values are identical to each other based on the result of the comparison, the verification result may be "Pass," and if not identical, the verification result may be "Fail."

Thus, the process of verifying the certificate of the user terminal 30 by the server 20 may be performed after the user requests access to the EDR data, but the embodiments are not necessarily limited thereto.

Figure 4:
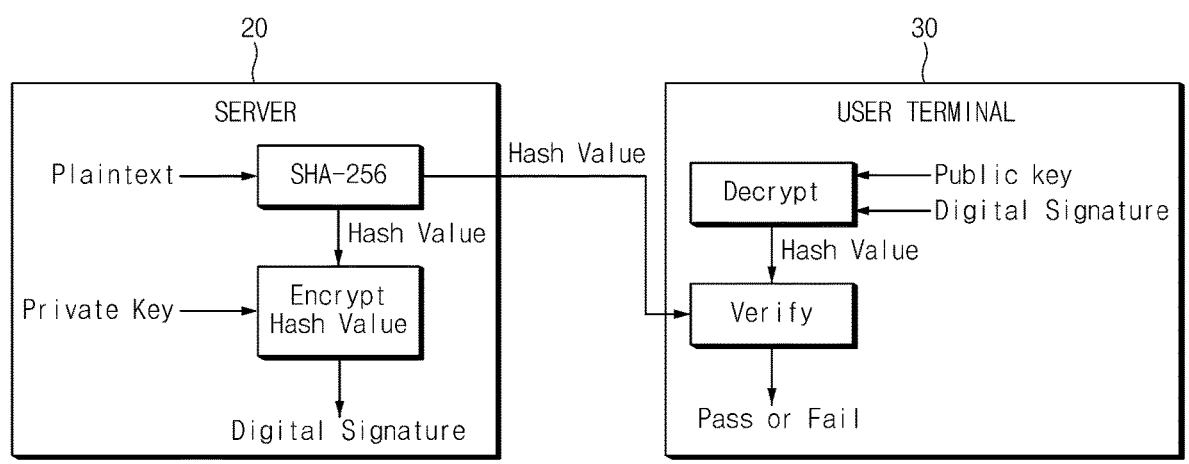
FIG. 4 is a diagram illustrating an example process of verifying a certificate.

FIG. 4 is a diagram illustrating an example process of verifying a certificate. FIG. 4 illustrates a process in which the user terminal 30 verifies the certificate of the server 20.

The server 20 may determine the hash value by inputting the plain text of the certificate into a hash function (e.g., SHA-256), and transmit the determined hash value to the user terminal 30. In this case, the server 20 may generate the digital signature by encrypting the hash value with the private key stored in the memory 21.

The user terminal 30 may request the certificate from the autonomous driving controller 10, receive the certificate of the autonomous driving controller 10, and decrypt the digital signature of the certificate with the public key included in the certificate. In this case, the result of decrypting the digital signature of the certificate may be a hash value.

The user terminal 30 may perform a hash value verification process by comparing the hash value of the certificate received from the server 20 with the hash value that is the result of the decryption. In this case, if the hash values may be identical to each other based on the result of the comparison, the verification result may be "Pass," and if not identical, the verification result may be "Fail."

Thus, the process of verifying the certificate of the server 20 by the user terminal 30 may be performed after the operator requests access to EDR data, but the embodiments are not necessarily limited thereto.

Figure 5:
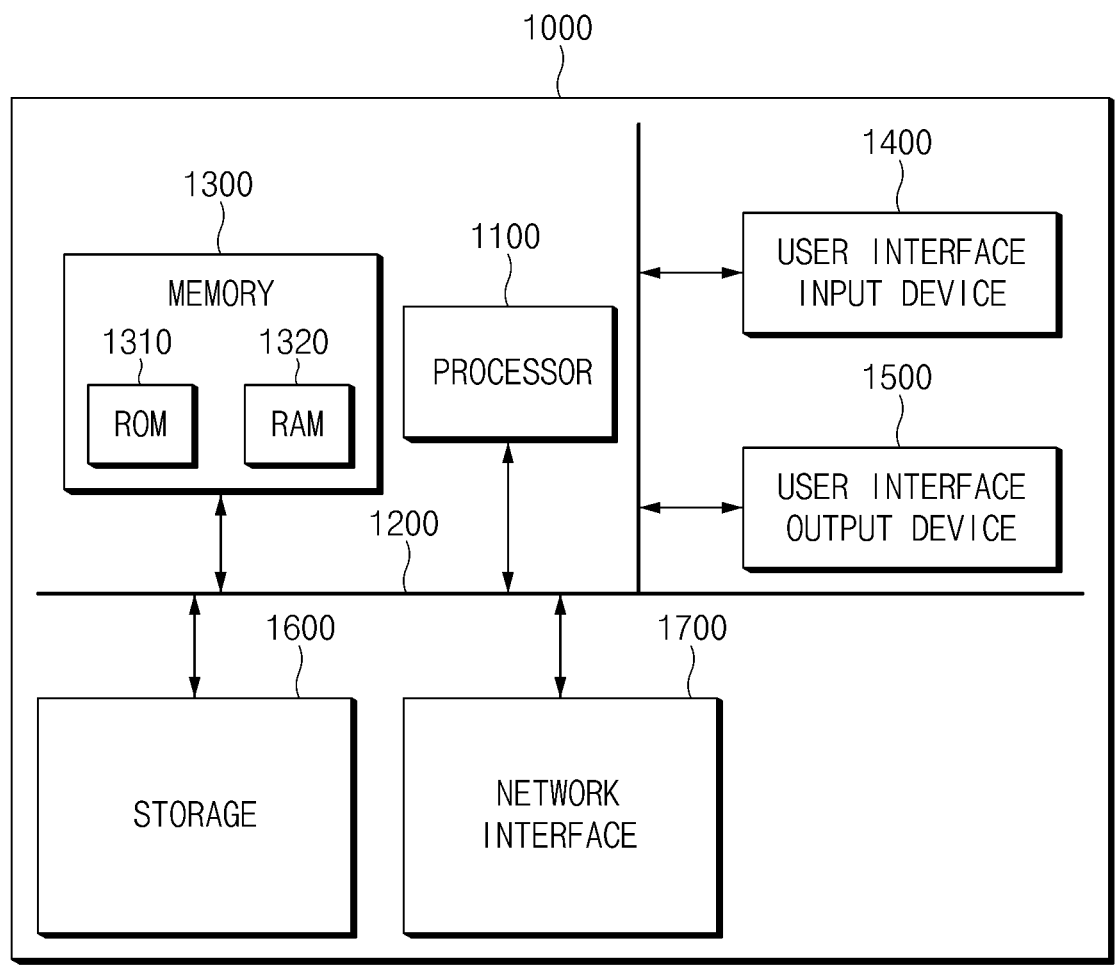
FIG. 5 is a block diagram illustrating an example computing system for executing a method of EDR data of a vehicle.

FIG. 5 is a block diagram illustrating an example computing system for executing a method of EDR data of a vehicle.

Referring to FIG. 5, a method of providing EDR data of a vehicle according to embodiments of the present disclosure described above may be implemented through a computing system. A computing system 1000 may include at least one processor 1100, a memory 1300, a user interface input device 1400, a user interface output device 1500, storage 1600, and a network interface 1700 connected through a system bus 1200.

The processor 1100 may be a central processing device (CPU) or a semiconductor device that processes instructions stored in the memory 1300 and/or the storage 1600. The memory 1300 and the storage 1600 may include various types of volatile or non-volatile storage media. For example, the memory 1300 may include a ROM (read-only memory) 1310 and a RAM (random access memory) 1320.

Accordingly, the processes of the method or algorithm described in relation to the embodiments of the present disclosure may be implemented by hardware executed by the processor 1100, a software module, or a combination thereof. The software module may reside in a storage medium (e.g., the memory 1300 and/or the storage 1600), such as a RAM, a flash memory, a ROM, an erasable programmable ROM (EPROM), an EEPROM, a register, a hard disk, solid-state drive (SSD), a detachable disk, or a compact disc ROM (CD-ROM). The exemplary storage medium may be coupled to the processor 1100, and the processor 1100 may read information from the storage medium and may write information in the storage medium. In another method, the storage medium may be integrated with the processor 1100. The processor and the storage medium may reside in an application-specific integrated circuit (ASIC). The ASIC may reside in a user terminal. In another method, the processor and the storage medium may reside in the user terminal as an individual component.

As described above, the method of providing EDR data in an autonomous driving controller may collect the EDR data of the vehicle to store the EDR data in a double buffer, generate transport layer security (TLS) sessions with a server and a user terminal, respectively when the accident risk of the vehicle exceeds a first threshold value, and transmit the EDR data to the server and the user terminal through the TLS session after encrypting the EDR data with a public key when the accident risk of the vehicle exceeds a second threshold value, thereby ensuring the confidentiality of EDR data while improving the user's convenience of access to EDR data.

In addition, as described above, the method of providing EDR data in a server may receive a certificate and encrypted EDR data from an autonomous driving controller, receive a hash value from a user terminal, decrypt a digital signature of the certificate with a public key included in the certificate, compare the decrypted result (e.g., hash value) with a hash value received from the user terminal, and decrypt the encrypted EDR data with a private key to transmit the EDR data to the user terminal if they are the same, thereby ensuring the confidentiality of EDR data while improving the user's convenience in accessing EDR data.

In addition, as described above, the method of providing EDR data in a user terminal may determine a hash value of a previously stored certificate, create a TLS session with the server, transmit a hash value to a server through the TLS session, and receive the decrypted EDR data from the server to provide the decrypted EDR data to a user, thereby ensuring the confidentiality of EDR data while improving the user's convenience in accessing EDR data.

Although exemplary embodiments of the present disclosure have been described for illustrative purposes, those skilled in the art will appreciate that various modifications, additions and substitutions are possible, without departing from the scope and spirit of the disclosure.

Therefore, the exemplary embodiments disclosed in the present disclosure are provided for the sake of descriptions, not limiting the technical concepts of the present disclosure, and it should be understood that such exemplary embodiments are not intended to limit the scope of the technical concepts of the present disclosure. The protection scope of the present disclosure should be understood by the claims below, and all the technical concepts within the equivalent scopes should be interpreted to be within the scope of the right of the present disclosure.

What is claimed is:

1. A method comprising:
   receiving, by a server, a first hash value from a user terminal;
   receiving, by the server, a certificate and encrypted event data recorder (EDR) data from an autonomous driving controller, wherein the certificate comprises a digital signature and a public key;
   decrypting, by the server and using the public key, the digital signature to obtain a second hash value;
   based on a comparison between the first hash value and the second hash value:
   decrypting, by the server and using a private key, the encrypted EDR data; and
   transmitting the decrypted EDR data to the user terminal; and
   deleting, by the server, the decrypted EDR data after the transmitting of the decrypted EDR data is completed.

2. The method of claim 1, wherein the first hash value corresponds to an output of a hash function based on a plaintext of the certificate stored in the user terminal.

3. The method of claim 1, further comprising:
storing, by the server, the private key in security key storage.

4. The method of claim 1, further comprising:
generating, by the server, transport layer security (TLS) sessions with the autonomous driving controller and the user terminal, respectively,
wherein the receiving of the first hash value and the transmitting of the decrypted EDR data are performed via the TLS sessions.

5. The method of claim 1, wherein the autonomous driving controller is configured to control autonomous driving of a vehicle.

6. A system comprising:
a server comprising a hardware processor; and
a user terminal configured to:
determine a first hash value of a certificate; and transmit the first hash value to the server, wherein the server is configured to: receive the certificate and encrypted event data recorder (EDR) data of a vehicle from an autonomous driving controller, wherein the certificate comprises a digital signature and a public key;
decrypt, using the public key, the digital signature to obtain a second hash value;
based on a comparison between the first hash value and the second hash value: decrypt, using a private key, the encrypted EDR data; and transmit the decrypted EDR data to the user terminal; and
delete the decrypted EDR data after transmitting of the decrypted EDR data is completed, and wherein the user terminal is further configured to:
receive, from the server, the decrypted EDR data; and
provide the decrypted EDR data to a user.

7. The system of claim 6, wherein the user terminal is configured to determine the first hash value by inputting a plaintext of the certificate into a hash function.

8. The system of claim 6, wherein the server is further configured to store the private key in security key storage.

9. The system of claim 6, wherein the user terminal is further configured to delete the decrypted EDR data after the user finishes accessing the EDR data.

10. A device comprising:
a hardware processor; and
memory storing instructions that, when executed by the hardware processor, cause the device to:
receive, from a user terminal, a first hash value of a certificate;
receive, from an autonomous driving controller, the certificate and encrypted event data recorder (EDR) data, wherein the certificate comprises a digital signature and a public key;
decrypt, using the public key, the digital signature to obtain a second hash value;
based on a comparison between the first hash value and the second hash value:
decrypt, using a private key, the encrypted EDR data; and
transmit the decrypted EDR data to the user terminal; and
delete the decrypted EDR data after transmitting of the decrypted EDR data is completed.

11. The device of claim 10, wherein the first hash value corresponds to an output of a hash function based on a plaintext of the certificate stored in the user terminal.

12. The device of claim 10, wherein the instructions, when executed by the hardware processor, cause the device to:
store the private key in security key storage.

13. The device of claim 10, wherein the instructions, when executed by the hardware processor, cause the device to:
generate transport layer security (TLS) sessions with the autonomous driving controller and the user terminal, respectively,
wherein receiving of the first hash value and the transmitting of the decrypted EDR data are performed via the TLS sessions.

14. The device of claim 10, wherein the autonomous driving controller is configured to control autonomous driving of a vehicle.

15. The device of claim 10, wherein the device is a server.

16. The device of claim 10, wherein the device is a computing device.

* * * * *